April 9, 1963
G. C. SIMONINI
3,084,488
PROCESS FOR THE TREATMENT OF VEGETABLE MATERIAL, PARTICULARLY
TOBACCO LEAF, FOR THE PURPOSE OF MAKING IT
READY FOR COMMERCIAL SHIPMENT
Filed Jan. 12, 1961
3 Sheets-Sheet 1
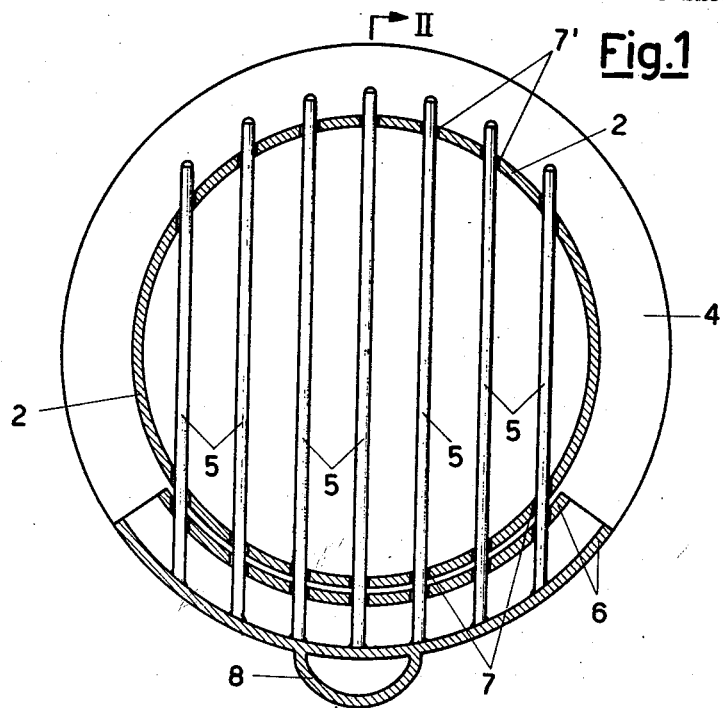
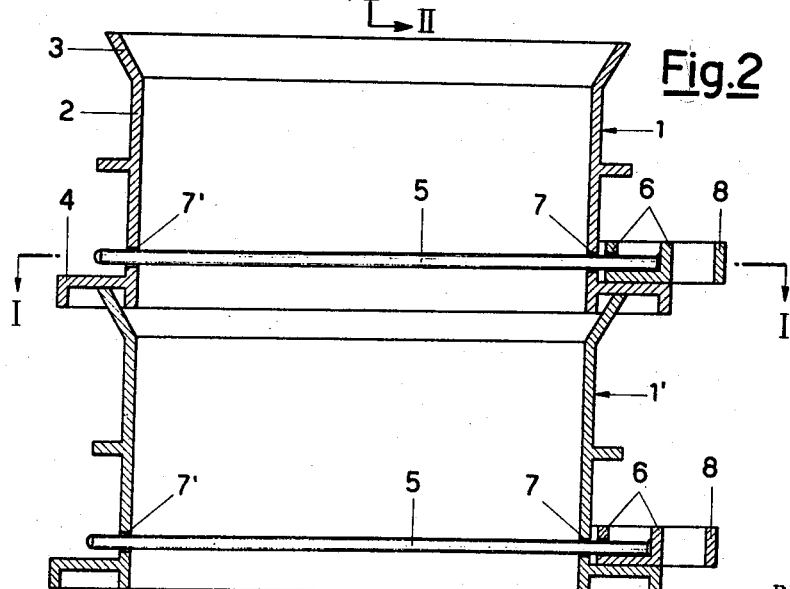
INVENTOR
Gian Carlo Simonini
BY Stevens, Davis, Miller & Mosher
ATTORNEYS April 9, 1963  G. C. SIMONINI  3,084,488
PROCESS FOR THE TREATMENT OF VEGETABLE MATERIAL, PARTICULARLY
TOBACCO LEAF, FOR THE PURPOSE OF MAKING IT
READY FOR COMMERCIAL SHIPMENT
Filed Jan. 12, 1961  3 Sheets-Sheet 2
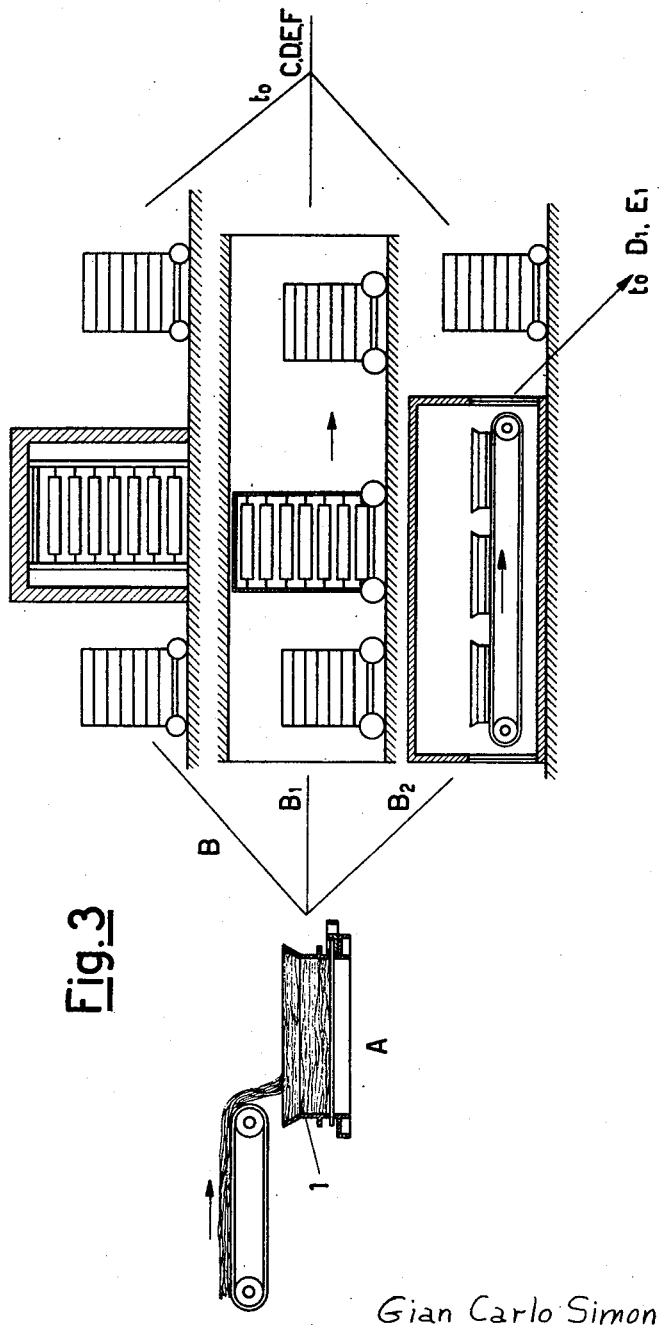
INVENTOR
Gian Carlo Simonini
BY Stevens, Davis, Miller + Mosher
ATTORNEYS

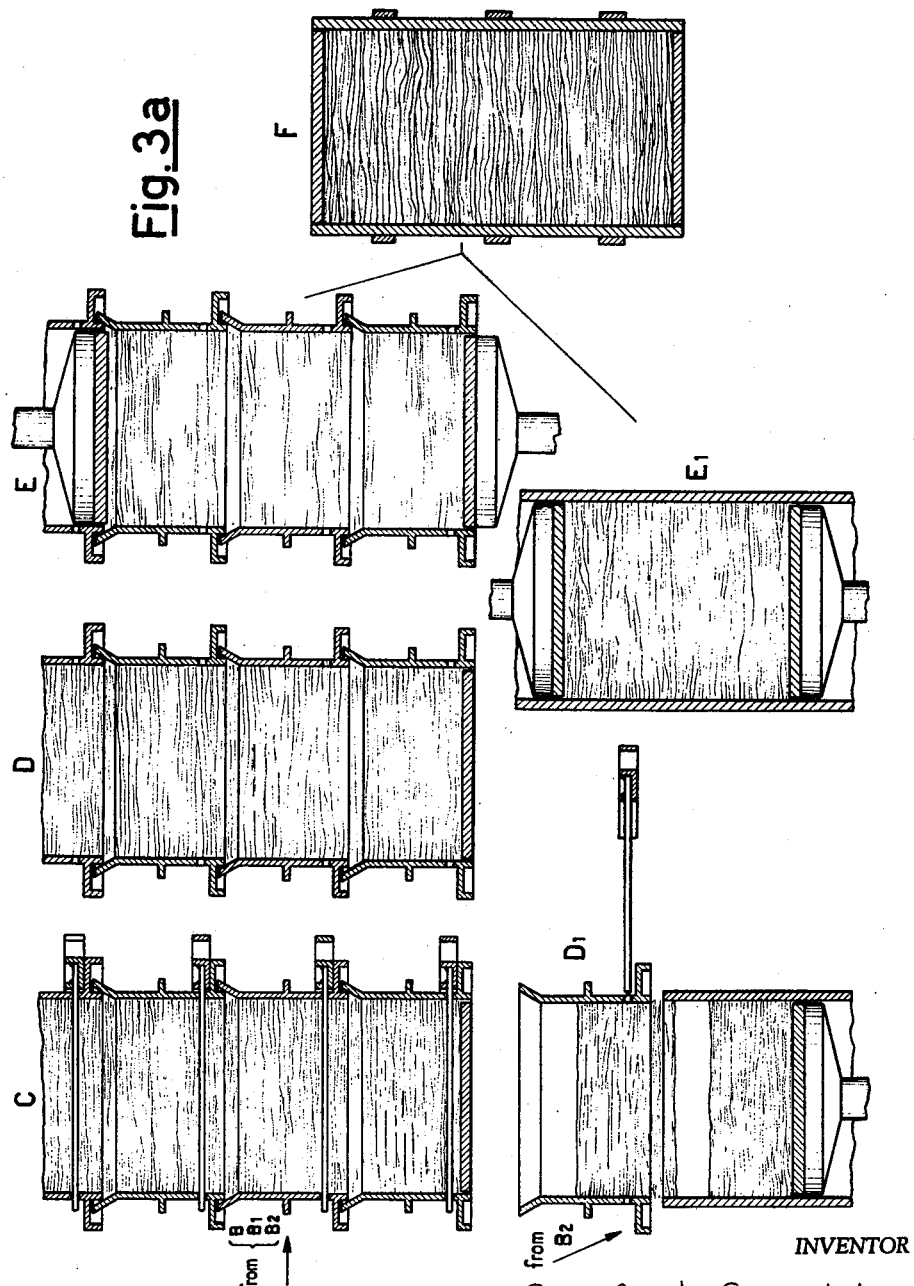

United States Patent Office 3,084,488
Patented Apr. 9, 1963

3,084,488
PROCESS FOR THE TREATMENT OF VEGETABLE MATERIAL, PARTICULARLY TOBACCO LEAF, FOR THE PURPOSE OF MAKING IT READY FOR COMMERCIAL SHIPMENT
Gian Carlo Simonini, Via Codevilla 7, Tortona, Italy
Filed Jan. 12, 1961, Ser. No. 82,301
Claims priority, application Italy Jan. 19, 1960
5 Claims. (Cl. 53—24)

The invention relates to a process for the treatment of vegetable material for the purpose of making it ready for commercial shipment.

The invention relates in particular to the treatment of tobacco leaf after it has undergone the normal processes of curing and selection by quality, colour, gumminess, wholeness and so on, and its purpose is to enable the leaf to be preserved and refined in quality.

It is known that cured tobacco leaf still has a residual water content which may vary from 17% to 25% approximately and which impairs its preservation and prevents it from being properly refined in quality. It is therefore necessary further to reduce the water content of the tobacco leaf and bring it down to the desired level which might be 12% for example or even lower.

The means used for reducing the water content are: drying in chambers by direct or indirect heat; drying in galleries after hanging the sheaves of tobacco up on stakes; or spreading the loose leaf out so that all parts thereof may be evenly heated.

Tobacco leaf dried in this way becomes extremely fragile and brittle. Steps are therefore normally taken to toughen it by making the dried leaf undergo a process of vaporization.

Finally, according to known methods, the dried and vaporized tobacco is removed from its temporary supports and placed in casks wherein it is pressed. It is at this stage that the heaviest and most exacting work of the whole process is required, not only because of the discomfort of having to work inside the casks in the presence of unpleasant and often harmful fumes, but also because the work is delicate and calls for great speed and skill.

An object of the present invention is to lighten the labour involved in carrying out said drying and vaporizing treatment and preparing the material for commercial shipment, by considerably reducing the amount of manpower required.

Other objects are to eliminate completely the operation of temporarily arranging the material in a special manner for drying and vaporization, and to enable a mass of material to be formed immediately after drying and vaporization, that is before the material has cooled down. A further object is to enable the material to be formed into a mass by arranging it in layers disposed one above the other.

Yet a further object is to permit the material to be treated in the form of loose leaves and to enable the leaves to be arranged in an orderly and uniform manner.

These and other objects are attained by means of the process according to the invention which consists in general of the stages of forming individual and distinct units of material all with the same cross section, subjecting said distinct units to drying and vaporization, disposing said units one contiguous to another with their cross sections in parallel planes, applying a pressure on said contiguous units in a direction perpendicular to said planes for the purpose of bringing said units together and forming a single compact mass and enclosing said compact mass in a packing means.

According to one possible application of the process defined hereinabove the individual units of material being dried and vaporized are so arranged that they are spaced vertically one above the other, and at the end of said treatment the individual units are brought together again so that they are still placed in mutual vertical relationship.

According to another possible application, the individual units are subjected to the drying and vaporization treatment while arranged in a row one behind the other. This method enables drying and vaporization to be carried out in galleries by means of conveying means adapted to transport the individual units through the drying and vaporizing zones provided in the gallery.

In order to form the individual units of material, particularly those of tobacco leaf, it is possible to use both the so-called sheaves or bundles and also, preferably, loose leaves arranged in layers having the same cross section. The stacking of the leaves can be carried out in an orderly and uniform manner so that the corresponding parts of the leaves are placed one above the other in different cross-sectional areas of the mass so formed which may thus be divided up by appropriate continuous cuts.

The mass so formed, before being packed, is compressed to the extent necessary to make it compact and suitable for preserving and to give it the required weight per packed unit.

The process according to the invention will now be described in greater detail with reference to the drawings which show schematically and purely for illustrative purposes, the means for bringing it about and the main stages of the process itself.

FIGS. 1 and 2 show respectively a horizontal cross section and a vertical cross section of some frames with removable bottoms in which the tobacco leaf is placed so as to form the individual and separate units, and FIGS. 3 and 3a are diagrams which show schematically the main steps which are followed in the process, FIG. 3a being the continuation of FIG. 3.

According to the invention, frames with removable bottoms, a possible embodiment whereof is illustrated in FIGS. 1 and 2, may be used in order to enable the material to be formed into the individual masses of equal cross section.

In FIG. 2 may be seen two ordinary frames of the type described placed one above the other and indicated by the numerals 1 and 1'. Each frame comprises a wall 2 of cylindrical type the cross section whereof may be circular (see FIG. 1) but may equally well have any other shape according to the cross-sectional shape of the mass of vegetable material which it is desired to obtain.

The upper part 3 of the wall 2 is inclined outwards so as to allow a partial joint to be made between two frames placed one above the other.

Near the bottom of wall 2 and integral therewith, a ring 4 is provided which is adapted to rest on the following frame. The bottom of the frame is composed of an appropriate number of parallel-spaced rods 5 which are connected to each other at one end by means of a member 6 formed in the shape of a circle arc and having a U-shaped cross section. The ends of the rods 5 may be welded in a suitable manner to the section 6. Pairs of holes, like those indicated by 7—7', are pierced in wall 2 above the outer ring 4 and the purpose of each pair is to permit a rod 5 to be passed therethrough as clearly illustrated in FIGS. 1 and 2. Section 6 may be fitted with a handle 8 to facilitate the removal and insertion of the removable bottom.

When two frames are placed one on top of the other, the lower portion of the wall 2 of the upper frame penetrates to a certain extent inside the lower frame and the lower face of the upper frame's ring 4 rests on the outwardly inclined upper part 3 of the lower frame (see FIG. 2). When the frames are placed one above another their bottoms, which are composed of the rods 5, may be taken away.

The practical design of the frames is obviously not restricted to the example described hereinabove and illustrated in the drawing. In practice containers of any type which can be fitted into each other, have the same cross section as that of the desired mass of vegetable material and whose bottoms can be easily removed and permit the passage of air, can be used.

It may be stated as a general guide that each container or frame should be capable of holding several kilograms of vegetable material, particularly tobacco leaf, although this weight is in no way critical and may vary within certain limits even from one container to another of those used to form the desired mass of tobacco.

It should obviously be endeavored to reduce as far as possible the differences in the weight of leaf from one container to another in order to obtain uniform drying and vaporizing.

The main stages in the process according to the invention will now be described and, with special regard to the case of the treatment of tobacco, reference will be made to the diagram in FIGS. 3 and 3a. The first step or stage of the process is that of stacking the tobacco leaf in the containers so as to form the individual distinct units. The part of FIG. 3 marked "A" illustrates this stage. The tobacco leaf in the form of loose leaves and already prepared sheaves or bundles, can be fed by means of a suitable conveyor such as a bolt, or by a hopper or the like, in the place where the frames are manually or automatically staked. It may be convenient to place the tobacco leaf in the containers in an orderly fashion with the thicker sinewy part of the bottom of the leaf concentrated in particular places so as to permit the subsequent separation thereof by means of appropriate continuous cuts into the formed mass.

The units of tobacco leaf so formed, which are substantially identical to each other, are then sent for drying and vaporizing treatment. The object of the drying treatment is to reduce the water content of the tobacco leaf (initially between 17% and 25%) and bring it down to the desired level (for example 12%). Under these conditions however, the leaf becomes extremely brittle like glass and breaks easily. For this reason steps are normally taken to change this brittle condition of the dried leaf by spraying the loaf with steam the main effects of which are to soften the gums and resins in the leaves and thus allow the leaves to come together and be compressed without breaking.

It should be observed, however, that this vaporization can in certain cases even be omitted if, for example, the leaves are allowed to rest for a suitable period.

Drying takes place, for example, at temperatures between 30° and 50° C., for a period which may vary from one to three hours, whilst if vaporization is carried out it usually takes only a few minutes.

This treatment can be carried out in various ways as shown schematically by B, $B_1$ and $B_2$ in the diagram in FIG. 3.

If a relatively small plant is involved, drying and vaporization can be carried out in chambers equipped with means for ventilation, suction and dry and damp heat circulation with related control and regulating gear. Chambers of this kind are in themselves well known and it is therefore thought superfluous to describe their constructional details. This method of treatment which may be termed "static" is shown by B in FIG. 3.

Units of tobacco leaf already formed and set in their frames are stacked one on top of another to form piles which are placed, for example, on suitable trolleys and then introduced into the drying chamber. Herein there are provided means such as vertical chains with hooks for vertically spacing apart the frames so as to allow the drying and subsequent vaporizing draughts to reach the tobacco leaf in the frames in a thorough and complete manner. The individual frames are suspended from the hooks of the vertical chains at a certain distance from each other and allowed to remain in the chamber for the necessary period of time. On completion of the treatment the frames are once again placed in direct contact one on top of another and a pile consisting of a certain number of frames placed on a suitable trolley can leave the chamber.

The drying and vaporizing treatment may be carried out in another manner in appropriate horizontal galleries as shown by $B_1$ in FIG. 3. In this case also a vertical pile of frames placed one on top of another enters the gallery when the frames, each of which contains a unit of tobacco leaf, are vertically spaced one from another by means of suitable gear such as chains with hooks and the like. While they are thus spaced apart, the frames are caused to pass along the gallery and the tobacco leaf undergoes the drying and vaporizing treatment in successive zones of the gallery. This system may be termed the continuous method and on coming out of the gallery the frames containing the treated tobacco leaf are again placed in reciprocal contact.

In both of the described methods of carrying out the drying and vaporization treatment in which, as we have seen, a plurality of units of leaf are simultaneously subjected to treatment, we obtain the considerable advantage of saving appreciably in heat energy, particularly that required for vaporizing, since the methods allow a large quantity of tobacco to be vaporized at once.

A further possible means of carrying out the treatment is shown schematically by $B_2$ in FIG. 3. By this method the individual frames filled with tobacco leaf are placed on a conveying device such as, for example, a belt or horizontal chains, and then caused to pass one after another through a drying and vaporizing gallery. This system may be chosen with advantage when it is desired to use an already existing gallery plant but, whereas in the prior art the tobacco loaf was caused to pass through galleries arranged on temporary supports such as stakes and the like or else in the form of loose leaves placed directly on a conveyor belt, it should be noted that in the present case the tobacco leaf is always arranged and stacked in individual and distinct units. Thus if desired, these units, on leaving the gallery can be placed one on top of another to form vertical columns or piles carried on trolleys and the need to handle the tobacco loaf, that is to transfer it from one means of support to another, is avoided. It may clearly be seen how the process according to the present invention gives rise to the great advantage of enabling the tobacco leaf to be treated while it is arranged and disposed in exactly the same form as it will have when finally pressed into a mass, that is to say it is in individual and distinct units of uniform and equal cross section which will go to form the mass of tobacco. In this manner we avoid the intermediate operation of laying out the tobacco in a special way for drying and vaporizing and we obtain the evident advantage of reducing and rationalizing the work and preventing breakages and shredding. Irrespective of what methods are used for drying and vaporizing, it is possible, in the example under consideration, to obtain finally vertical piles of stacked frames containing the units of dried and vaporized tobacco leaf as shown by C in the diagram in FIG. 3a. The stacking of the frames causes the tobacco leaf contained therein to be lightly pressed down and this prevents the individual units of leaf from losing the shape and arrangement which they had before being treated and which they must keep in the final mass. Furthermore this mode of stacking allows the bottoms of the frames, which supported the several units of tobacco leaf in their respective frames during the previous stages of the process, to be removed. It is convenient to place a board made of wood or other material, having the same shape as the cross section of the frames, underneath the bottom frame of the pile. The bottoms of the several frames are then withdrawn (see D in FIG. 3a) and the individual units of tobacco leaf are thereby brought together while still retaining their original arrangement, to form a single mass whose contours are determined by the internal shape of the frames and which contains all the layers of tobacco which were placed in the frames. This mass is then further pressed in an axial direction by a suitable press (see E in FIG. 3) to make it more compact. The frames are thereupon removed by dismantling them, lifting them up or pushing out the mass formed within them which is ready to be clad in the packing means which is so designed that it completely encloses the said mass (see F in FIG. 3a). These packing means may consist of casks or other rigid or relatively flexible containers according to requirements and convenience.

According to one possible variant of the process described, instead of vertically stacking the frames or containers holding the individual units of tobacco leaf on completion of the drying and vaporizing treatment and then proceeding to form a single mass therefrom, the contents of each frame may be unloaded separately, preferably immediately after vaporization, and the material may be collected in a suitable container with the same cross section as that of the frames. This container may be provided with a sinking floor on which the material unloaded from the frames after their bottoms have been extracted, is deposited keeping the same arrangement and layer formation as it had when in the frames. The floor of the collecting container is caused to sink as the container is filled and the stratified mass inside the container is then subjected to compression by means of a suitable press to form a single compact mass which can be clad in packing means as previously described.

This practical variant is particularly appropriate in cases where the individual units of tobacco leaf are not given the drying and vaporizing treatment whilst they are vertically stacked, but whilst they are in some other arrangement as, for example, in a row as shown by B₂ in the diagram in FIG. 3. The respective stages of forming a unified mass in a separate receptacle and compressing said mass are schematically shown by D₁ and E₁ in FIG. 3a. It is manifest that by means of the process according to the present invention, we have eliminated the traditional operation of casking the tobacco leaf which consisted in manually removing the vaporized leaf as quickly as possible from its temporary supports and stacking it in the casks. This operation was in fact the most laborious and delicate of the whole process according to traditional methods. The workmen were obliged to work inside the casks in the presence of unpleasant and often harmful fumes. Moreover, no matter how quickly and skillfully the transfer from the vaporizing chamber to the casks was made, the vaporization used to lose some of its effect during the transfer in spite of the precautions taken such as wrapping the tobacco in woolen cloths until it had been handed over to the workman who was to stack it in the casks.

By means of the process according to the invention, on the other hand, no particular handling is required and even the packing of the tobacco leaf can be carried out with extreme ease. The further advantage of packing the mass while it is still warm is obtained and this enhances the degree of refinement in quality which it is possible to obtain—a particularly important factor when dealing with inferior tobacco such as stained green leaf.

The process according to the invention has been described for illustration and example and it is not intended to limit the embodiments thereof to those described which may be modified according as circumstances and practical needs dictate.

Moreover it should be observed that the process is not confined to the treatment of tobacco leaf but may be applied also to the treatment of other vegetable leaves and fibres such as for example medicinal herbs.

I claim:

1. A process for the treatment of tobacco leaves comprising the steps of forming individual and distinct vertically superimposed units of tobacco leaves all with the same cross section, maintaining said units in vertically spaced relation, subjecting said units to drying and vaporization, uniting said units and disposing them contiguously to one another with their cross sections in parallel planes, applying a pressure on said contiguous units in a direction perpendicular to said planes for the purpose of bringing said units together and forming a single compact mass and enclosing said compact mass in a packing means.

2. For use in a redrying process in the treatment of tobacco leaves, a container having opposing open ends and having externally extending projections on the ends, whereby a plurality of such containers can be arranged in vertically superimposed relationship, said container being provided, adjacent one of its ends, with a plurality of openings in its outer wall, said openings being arranged so as to define two confronting pluralities of coplanar openings placed on opposite sides with respect to a vertical plane of symmetry of said container and a plurality of bars adapted to be slipped into and removed from said openings with the bars being disposed in spaced parallel relationship.

3. The combination of claim 2, wherein one end of each bar is fixed to a rigid connecting member common to all of said bars and having a shape complementary to the shape of the side wall of the container.

4. For use in a process for the treatment of tobacco which comprises the steps of forming individual stacks of tobacco leaves, subjecting them to drying and steaming and applying a pressure to said stacks so as to form a compact mass of uniform cross section ready for packaging and shipment, the combination comprising a cylindrical container having a belled-out upper end and a ring-shaped projection around its lower end, said cylindrical container being perforated in its outer wall so as to define two confronting pluralities of coplanar openings placed on opposite sides with respect to a diametrical vertical plane of said container, and a plurality of bars adapted to be slipped into and removed from said openings.

5. The combination claimed in claim 4, wherein one end of each bar is solidly affixed to an arcuate connecting member common to all of said bars and having a radius of curvature not less than the radius of curvature of the outermost cylindrical surface of said container.

References Cited in the file of this patent

UNITED STATES PATENTS

| | | |
|---|---|---|
| 465,382 | Marks | Dec. 15, 1891 |
| 496,221 | Gibon | Apr. 25, 1893 |
| 843,325 | Confield | Feb. 5, 1907 |
| 2,105,848 | Touton | Jan. 18, 1938 |